Dec. 6, 1966 M. E. HINES 3,290,624
PHASE SHIFTER IN ITERATIVE CIRCUITS USING SEMICONDUCTORS
Filed Feb. 10, 1964 4 Sheets-Sheet 1

INVENTOR.
MARION E. HINES
BY Rosen & Schiller
ATTORNEYS

INVENTOR.
MARION E. HINES
BY Rosen & Schiller
ATTORNEYS

INVENTOR.
MARION E. HINES
BY
Rosen & Schiller
ATTORNEYS

INVENTOR.
MARION E. HINES
BY Rosen & Schiller
ATTORNEYS 3,290,624
Patented Dec. 6, 1966

3,290,624
PHASE SHIFTER IN ITERATIVE CIRCUITS USING SEMICONDUCTORS

Marion E. Hines, Weston, Mass., assignor to Microwave Associates, Inc., Burlington, Mass., a corporation of Delaware Filed Feb. 10, 1964, Ser. No. 343,689
15 Claims. (Cl. 333—31)

This invention relates in general to introducing phase shift into an electromagnetic wave propagating in a transmission line or waveguide and more particularly to iterative circuits using a plurality of semiconductor devices each lightly coupled to a high power wave to introduce a plurality of cumulative small phase shifts in the wave.

I have discovered that a small phase shaft can be introduced in a high power wave propagating in a transmission line by the use of a semiconductor device, for example, a diode of relatively lower power rating which is lightly coupled to the wave. Thus, considering, for example, a two-conductor transmission line, the phase shift introduced in a wave propagating between the two conductors can be altered by effecting a change in the inductance, or the capacitance, or both between the two conductors with the aid of one or more diodes in a circuit configuration which includes means for the application of a voltage to switch the diode or diodes between two different conductivity states. More particularly, such configurations can be employed effectively to lower or to raise the inductance, or to increase or decrease the capacitance, per unit length of transmission line by the application of a control voltage to the diode; in certain configurations, a single control voltage can be employed effectively to increase or to decrease simultaneously both the inductance and capacitance per unit length of transmission line and thereby to introduce a phase shift into the wave while maintaining the characteristic impedance of the line substantially constant. The phase shift can be introduced by each circuit configuration simply through the application thereto of a voltage, which becomes the phase control voltage.

I have discovered further that if such circuit configurations are employed in iterative arrays along a transmission line the respective individual phase shifts introduced by each into the wave become cumulative, and with this technique arbitrarily large phase shifts can be obtained with low total attenuation. This technique further makes it possible to switch the phase of a wave as seen at a given point in a transmission line between two arbitrarily chosen values, with reference to the phase of the same wave as seen simultaneously at an upstream point in the line.

The individual circuit configurations may employ simply switchable diodes, in which case the application of a control voltage alters the diode state between conducting and non-conducting, or they may employ voltage-variable-capacitance type diodes (i.e., varactors) so that the phase shift is proportional to a parameter of a variable applied voltage. Transistors may also be employed, with a variable applied voltage.

Semiconductor diodes have been used for many years as RF switching elements. The RF impedance (for limited signal strength) may be switched from one value (usually small) in a forward-biased or conducting state to another (usually larger) value in a reverse-biased, non-conducting state. In RF switching networks, the diodes are incorporated into coaxial or waveguide transmission paths in such a manner that a change in diode impedance causes a change in RF signal transmission. The diode impedance changes are brought about by changes in the D.C. bias which is applied to the diode through leads which are isolated from the signal by RF chokes and by-pass capacitors. The present invention takes advantage of these properties of semiconductor diodes as RF switching elements.

It is thus an object of the invention to provide circuits for introducing a phase shift into an electromagnetic wave propagating in a transmission line. More particularly, the invention has as a general object to provide such a circuit employing, in a transmission line, a semiconductor device capable of being voltage-biased to establish at least one of its electrical characteristics, means coupling said device to said line, said coupling means being arranged to couple said device so lightly to said wave that electromagnetic voltage and current, each of a magnitude which is small with respect to the respective magnitudes of the electromagnetic voltage and current components of said wave, are imposed across said device, and means independently to apply a unidirectional voltage across said device to control an electrical characteristic thereof and thereby control the coupling of said coupling means. The semi-conductor device may be reactively coupled, either inductively or capacitively, or in some embodiments a plurality of semi-conductor devices may be coupled in pairs, one capacitively and the other inductively, to the wave propagating in the transmission line.

Having thus delineated the general nature and purpose of my invention, I will now describe a number of embodiments of it in greater detail with reference to the accompanying drawings, wherein:

FIG. 1 schematically illustrates an iterative array of switchable diode circuits for altering the effective mutual inductance between two conductors of a transmission line by the application thereto of a control voltage;

FIG. 2 schematically illustrates an iterative array of switchable diode circuits for altering the effective capacitance between two conductors of a transmission line by the application thereto of a control voltage;

FIG. 3 schematically illustrates a transmission line fitted with an iterative array of switchable diode circuits, and FIG. 4 schematically illustrates an equivalent circuit for FIG. 3 showing switches to represent diodes, in which both the effective inductance and capacitance between two conductors of a transmission line can be altered in the same direction simultaneously while maintaining the characteristic impedance of the line substantially unaltered;

FIGS. 8–11, inclusive, illustrate two somewhat similar modes of applying the invention for use in a waveguide; and FIGS. 12–15, inclusive, illustrate another mode of applying the invention for use in a waveguide.

Figure 1:
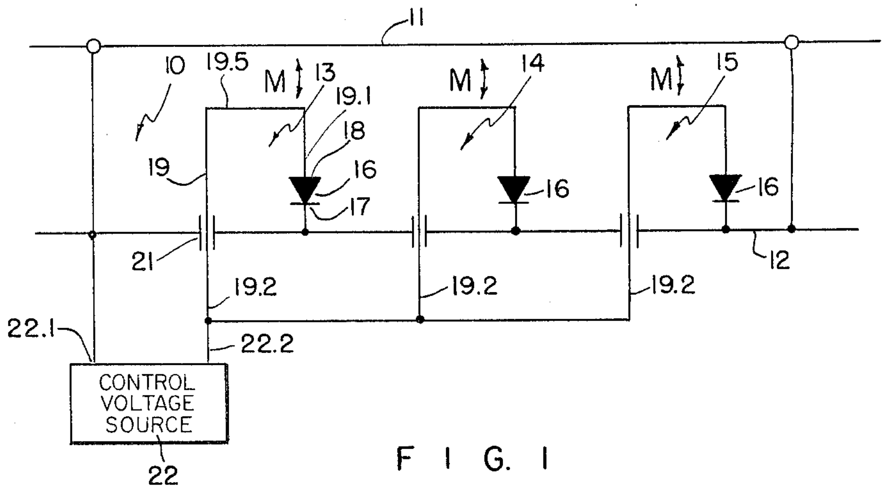

Referring to FIG. 1, a section of coaxial transmission-line 10 is represented by first and second (i.e. inner and outer) conductors 11 and 12. Loops 13, 14 and 15 are comprised of similar circuits, each of which includes a switchable diode 16 connected at a first terminal 17 to the second or outer conductor 12 and at the remaining terminal 18 to one end 19.1 of a loop conductor 19 having a portion 19.5 adjacent the first conductor 11 so as to couple mutually via mutual inductance M with the first conductor for an electromagnetic wave of appropriate (e.g. microwave) frequency propagating in the transmission line. The loop conductor 19 passes through a by-pass capacitor 21 in the outer conductor 12 and is connected at its other end 19.2 to a control voltage source 22. The control voltage source is connected at one side 22.1 to the outer conductor 12 and at the other side 22.2 it is connected to the ends 19.2 of all the loop conductors 19 in parallel. The voltage source 22 is so arranged that, as desired, it can apply to each diode 16 a voltage which renders the diode conductive, or a voltage which renders the diode non-conductive. Each diode 16 is of the switchable variety, as represented, for example, by a P-I-N diode.

In RF switching applications, diodes are commonly operated in one or the other of two alternative D.C. bias states. Usually, a reverse-bias and a forward-bias condition are chosen to provide the largest practicable change in RF impedance when the bias is changed from one state to the other.

In the forward-bias state, the diode is usually caused to conduct a substantial D.C. current. In this case, the small-signal or incremental RF impedance is small. On the other hand, in reverse-bias, D.C. conduction is negligible because of the formation of a barrier zone in the semiconductor between the "P" and the "N" regions. This region is swept free of holes and electrons and acts as a dielectric layer between the conducting "P" and "N" zones on either side. In changing from reverse-bias to forward-bias, this barrier or dielectric region becomes permeated with both holes and electrons and acts as a conductor. The barrier or dielectric region forms a finite capacitance which has a significant RF reactance. Thus, the RF impedance change which occurs when shifting the bias from forward to reverse is equivalent to breaking the conductive path and inserting a finite capacitor in series.

Recent developments in P-I-N type diodes have permitted large increases in the power capacity of these diodes as switches, and significant reduction in signal losses. These diodes have low capacitance and very high impedance when reverse-biased, and can also withstand large RF voltages. In forward-bias, A.C. resistance is sufficiently low that many amperes of RF current can be permitted. Because of these desirable characteristics, P-I-N diodes are greatly superior to varactor or other microwave diodes as switching elements. It should be understood, however, that varactors and other microwave diodes, as well as transistors, may be employed in the present invention.

Figure 5:
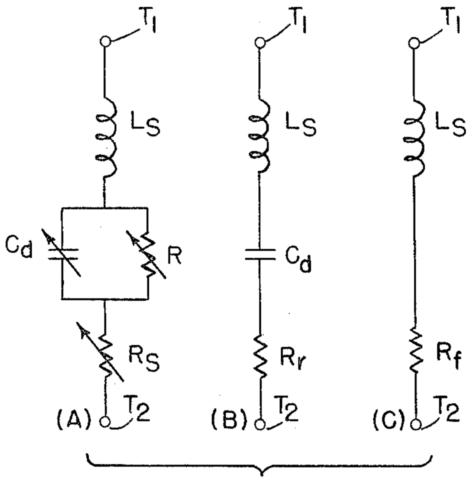
FIG. 5 is a set of equivalent circuit diagrams to illustrate the properties of a typical P-I-N diode as employed in a switchable-diode configuration according to the invention.

FIG. 5A shows the general RF equivalent circuit usually accepted for many types of rectifying semiconductor diodes, such as the PIN switching diode, a varactor, a power rectifier, a computer type, etc., in which the RF impedance can be varied by a change in bias voltage. Any such type of diode is usable and applicable to this invention, although the PIN and Varactor types, designed for high frequencies, are most generally useful. This circuit is applicable for a wide continuous range of bias voltages. In this circuit, the inductance $L_S$ is generally assumed to be constant. The capacitance $C_d$ is variable and represents the derivative of the stored charge with respect to the voltage. In a varactor, it is usually a smooth function of voltage throughout the negative or reverse bias range. In a P-I-N diode, this capacitance is nearly constant at high frequency over most of the reverse-bias range. R is a "distributed" resistance which appears in shunt with $C_d$ and is variable in accordance with the voltage applied across the terminals $T_1$ and $T_2$ of the diode. The series resistance $R_s$ is approximately constant for reverse-bias conditions, but may be significantly reduced by *conductivity modulation* when direct current flows, because the density of charge carriers in the semiconductor can increase in such circumstances.

For switching purposes, we consider only two bias conditions, for which the approximate equivalent circuits of FIGS. 5B and 5C are applicable. These figures represent an ideal switch plus passive network elements. In reverse-bias (FIG. 5B) the ideal switch is open and we have a series combination of inductance, $L_S$, capacitance, $C_d$, and the reverse series resistance $R_r$. For forward-bias (FIG. 5C) we close the ideal switch which effectively shorts out the capacitor, $C_d$, with a low resistance, $R_f$. This simple circuit is an acceptable approximation for frequencies such that $R_f$ is small compared to the reactance of the capacitor.

Referring to the circuit of the first loop 13, when the diode 16 is in the conductive state, R.F. current from a wave propagating in the transmission line will flow in loop conductor 19 between the second conductor 12 at the by-pass capacitor 21 and the conductor 12 at the first diode terminal 17, but when the diode 16 is in the non-conductive state this current flow is substantially reduced. Thus, flow of this R.F. current in the loop conductor 19 is controlled by the voltage source 22 via the switchable diode 16. When the diode is shorted (i.e. rendered conductive by the voltage source 22) the mutual inductance M with the first (or inner) conductor 11 has the effect of reducing the distributed inductance per unit length of the transmission line 10. This causes a shift in the phase of an electromagnetic wave propagating in the line 10.

The loop conductor 19 is lightly coupled to the electro-magnetic wave so that only small R.F. voltage and current, with respect to the magnitudes of the voltage and current of the wave energy propagating in the line, is impressed across the diode 16. By the same token, the magnitude of the phase shift introduced in the wave when the diode is switched from one state to the other (conductive to non-conductive, or vice versa) is small. However, these parameters are variable over wide limits, depending upon the voltage and current that may be impressed across or through a given diode.

Each loop circuit may be regarded as constituting a phase-shift section in the transmission line 10. By providing iterative loop circuits or phase-shift sections 13, 14, 15, etc., spaced axially along the transmission line 10, these phase shifts are made cumulative, and they add to a larger phase shift of any arbitrary magnitude. Thus, a small phase shift can be introduced in a high power wave using a low power diode lightly coupled to the wave, and by using a plurality of such diodes in iterative circuits arbitrarily large phase shifts can be obtained. Since each loop circuit, and each diode, is only lightly coupled to the wave, the phase shift in each case, and the cumulative phase shift, can be obtained with low attenuation. Further, all this can be obtained using diodes of low power rating since the diode need not carry voltage or current as great as is found in the transmission line itself.

Assuming in a single phase-shift section 13, 14 or 15 that the switch diode 16 carries the maximum rated current Im when closed (i.e., conductive) and is subjected to the maximum rated voltage Vm when open (i.e., not conductive), the relationship between the maximum phase change $\Delta\phi$ due to the phase-shift section and the input power from the line $P_L$ to the phase-shift section is given by the equation:

$$\Delta\phi = \sin^{-1}\frac{VmIm}{4P_L} \qquad \text{Relation (1)}$$

from which:

$$P_L = \frac{VmIm}{4\sin\frac{\theta}{2}} \qquad \text{Relation (2)}$$

For the exemplary case in which:

$Vm = 100$ volts,
$Im = 1$ ampere, and
$\phi = 10°$
$P_L = 100/4 \times 0.087 = 287$ watts Thus, a diode rated at 100 volt-amperes can be employed to shift the phase of 287 watts of applied RF power by ten (10) degrees when it is subjected to its maximum rated voltage (open circuit) and current (closed circuit).

Figure 2:
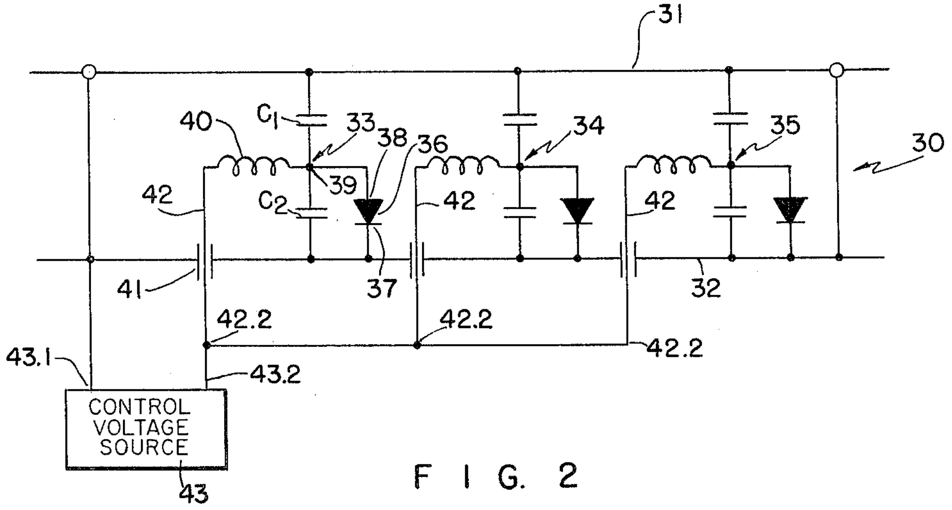

Referring to FIG. 2, a section of coaxial transmission line 30 is represented by first and second (i.e., inner and outer) conductors 31 and 32. Iterative circuits 33, 34 and 35 are connected across the line; these circuits are similar, and only the first, 33, will be described in detail. First and second capacitors $C_1$ and $C_2$ are connected in series from the inner conductor 31 to the outer conductor 32; the second capacitor $C_2$ which is connected to the outer conductor may have a capacitance larger or smaller than that of the first capacitor $C_1$, as will be explained below. A switchable diode 36 is connected at one terminal 37 to the outer conductor 32 and at the other terminal 38 to the common junction 39 between the two capacitors. An inductor 40 is connected at one side to this common junction and at the other side to an end of a conductor 42 which passes through a by-pass capacitor 41 in the outer conductor 32 and is connected at its other end 42.2 to a control voltage source 43. This control voltage source has the same purpose as the control voltage source 22 in FIG. 1, and is connected at one side 43.1 to the outer conductor 32 and at the other side 43.2 to the ends 42.2 of the conductors 42 of all of the iterative circuits 33, 34 and 35.

When the diode 36 is biased to an effectively non-conductive, or open-circuit, state, the total capacitance of the two capacitors $C_1$ and $C_2$ in series appears across the two conductors 31 and 32, for each of the iterative circuits. When the diode 36 is biased to as effectively conductive, or closed-circuit state, the second capacitor $C_2$ is effectively shorted out, thereby increasing the effective capacitance between the two conductors 31 and 32. The inductor 40 is a radio-frequency choke. The control voltage source 43 provides the necessary bias and control voltages, which are D.C. potential differences. Again, as in FIG. 1, the diodes are only lightly coupled to a wave propagating in the line, and only small voltage and current relative to the voltage and current of the radio-frequency power propagating in the transmission line 30 appears across or through any one of the diodes. The capacitor $C_1$ and $C_2$ are, in effect, a voltage divider across the line 30; the magnitude of the voltage applied across the diode 36 in the open-circuit switch condition can be adjusted by selecting an appropriate ratio of voltage division, through selection of an appropriate ratio of their capacitances. When the second capacitor $C_2$ is effectively shorted out, the capacitance per unit length of the line is effectively increased.

In FIG. 2 the capacitance of the second capacitor $C_2$ may in practice be supplied by the distributed capacitance of the diode 36. Referring again to FIG. 5B, it will be seen that $C_d$ is actually in parallel with $C_2$ in FIG. 2, and may be substituted for $C_2$ in a particular circuit configuration. The capacitance $C_d$ is small in reverse bias and may be made into a near-shortcircuit when the diode is forward biased.

Referring again to FIG. 2, suppose the capacitance of capacitor $C_1$ is small compared with that of capacitor $C_2$ (or of $C_d$ of the diode 36 if $C_d$ constitutes the entire capacitor $C_2$). For example, $C_1$ may have an impedance of $-j500$ ohms, while $C_2$ may have an impedance of $(1-j100)$ ohms when the diode is in reverse bias, and an impedance of 1 ohm when the diode is in forward bias. The total impedance in each case is $(1-j600)$ ohms in reverse bias and $(1-j500)$ ohms in forward bias. Suppose, for illustration, that the transmission line 30 has a characteristic impedance of 50 ohms and is carrying electromagnetic wave energy at a power level of 5 kw. The R.F. voltage on the center conductor 31 will be 500 volts R.M.S., and the R.F. current will be 10 amperes R.M.S. The voltage on the diode 36 will be reduced to 500/6, or 83 volts in the reverse state, and the diode current will be one ampere in the conducting state. The maximum power dissipated in the diode will be one watt, in this example.

Thus, it will be seen that a single phase shift section as described herein with respect to FIG. 1 or FIG. 2 can employ a diode to perturb the transmission of a high power wave of high voltage and current without imposing on the diode either current or voltage beyond its rating, which may be much smaller.

In each of FIG. 1 and FIG. 2, the iterative phase-shift sections 13, 14 and 15, or 33, 34 and 35, respectively, should be spaced at intervals substantially less than one-half wavelength apart axially along the transmission line 10 or 30, respectively, relative to the mid-band frequency of the electromagnetic wave energy propagating in the line. A net phase shift in the transmission of the wave will occur when the diodes are switched from one state to the other. A single phase-shift section according to FIG. 1 or FIG. 2, for example, may cause a relatively small perturbation of the wave propagating in the transmission line 10 or 30, resulting in a phase shift of the order of one degree. The use of iterative phase shift sections as herein described enables the cumulation of such small perturbations to achieve an arbitrarily large phase shift in a high power wave with a plurality of low-power diodes.

Figure 3:
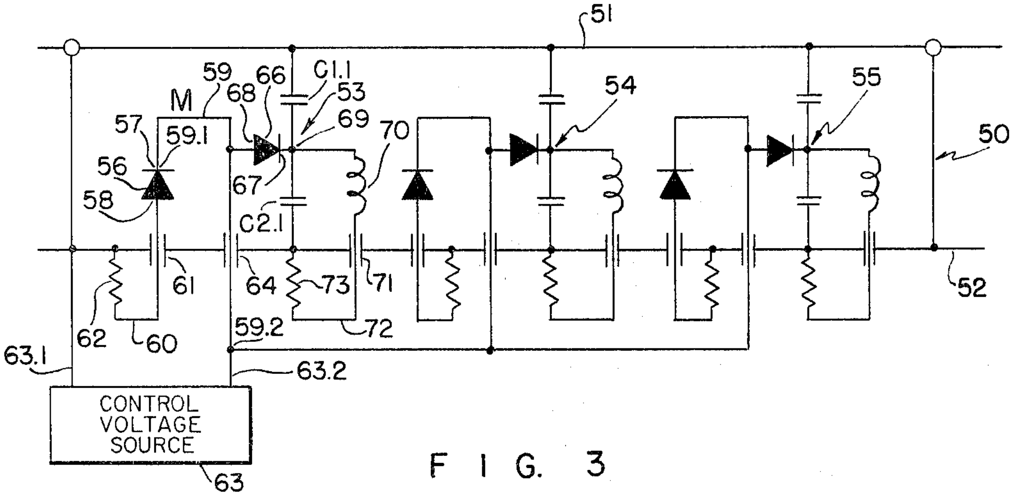

FIG. 3 illustrates a transmission line fitted with an iterative array of diode phase-shift sections arranged to provide a constant-impedance phase shifter of arbitrarily large phase shift. It will be recalled from the foregoing discussion of FIG. 1 that when the diode 16 is rendered conductive (i.e. shorted) it is effective to lower the inductance per unit length of the line 10; conversely, when the diode 16 is rendered non-conductive (i.e., open-circuited) it is effective to raise the inductance per unit length of the transmission line. In FIG. 2, when the diode 36 is rendered conductive (i.e., shorted) it is effective to increase the capacitance per unit length of the line 30; conversely, when the diode 36 is rendered non-conductive (i.e. open-circuited) it is effective to reduce the capacitance per unit length of the transmission line. In FIG. 3, each phase shift section combines the function of FIGS. 1 and 2 in an arrangement which maintains the relationship $$\sqrt{L/C}=K$$

in the line 50, where:

L is the inductance per unit length of the line;
C is the capacitance per unit length of the line; and
K is a constant.

In this arrangement the characteristic impedance Z remains constant while the phase shift or perturbation is imposed on a wave propagating in the line.

The line 50 is a coaxial line represented by a first or inner conductor 51 and a second or outer conductor 52. Three phase-shift sections 53, 54 and 55 are illustrated; these are identical, and only the first section 53 will be described. This section has a first diode 56 connected at one terminal 57 to one end 59.1 of a loop conductor 59 corresponding to the loop conductor 19 of FIG. 1. The remaining diode terminal 58 is connected to a conductor 60 which passes through the outer conductor 52 via a first by-pass capacitor 61 and is connected to the outer conductor through a resistor 62. The second end 59.2 of the loop conductor passes through the outer conductor 52 via a second by-pass capacitor 64 and is connected to one terminal 63.2 of a control voltage source 63, the second terminal 63.1 of which is connected to the outer conductor 52 of the line. The loop conductor 59 is connected also to one terminal 68 of a second diode 66, the second terminal 67 of which is connected to the common junction 69 of two capacitors $C_{1.1}$ and $C_{2.1}$ connected across the line in the same manner as the corresponding capacitors $C_1$ and $C_2$ in FIG. 2. A choke 70 is connected at one side to this common junction and at the other side to a conductor 72 which passes through the outer conductor 52 via a by-pass capacitor 71 and is connected to the outer conductor through a resistor 73.

The diodes 56 and 66 are so poled, relative to each other, that a control voltage which biases one of them to the conductive state simultaneously biases the other to the non-conductive state. Thus, if the first diode is made non-conductive, the second diode is simultaneously made conductive; and consequently, the inductance and the capacitance per unit length of the line 50 are both increased simultaneously.

Figure 4:
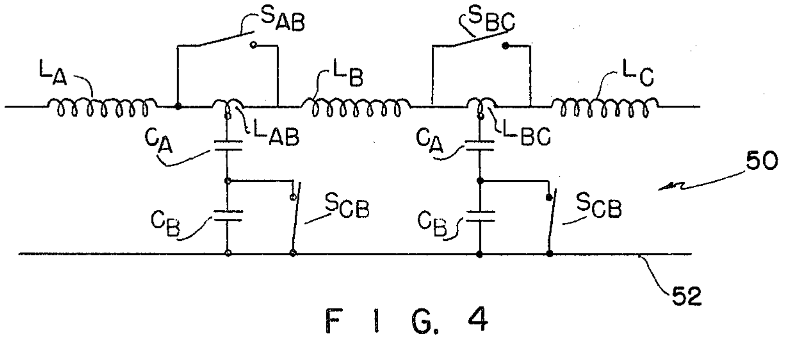

FIG. 4 is a simplified equivalent circuit of FIG. 3. The line inductance is represented by inductors $L_A$, $L_{AB}$, $L_B$, $L_{BC}$ and $L_C$ in series. Switches $S_{AB}$ and $S_{BC}$ corresponding to switchable diodes 56, are connected across each of the smaller inductors $L_{AB}$ and $L_{BC}$. Pairs of capacitors $C_A$ and $C_B$ in series are connected across the line from $L_{AB}$ and $L_{BC}$, respectively, to the other side 52. Switches $S_{CB}$, corresponding to switchable diodes 66, are connected across each capacitor $C_B$. The operation described above with reference to FIG. 3 is achieved by simultaneously opening switches $S_{AB}$ and closing switches $S_{CB}$, or vice versa. Thus, to increase the line inductance and capacitance simultaneously, switches $S_{AB}$ are opened and switches $S_{CB}$ are closed.

The phase shift per unit length of transmission line due to each phase-shift section in FIG. 3 may be expressed as follows:

$$\beta=\omega\sqrt{(L+\Delta L)(C+\Delta C)}$$

where $\beta$ is the phase shift per unit length;
$\omega$ is the frequency of the wave propagating in the line;
L is the inductance per unit length of the line;
$\Delta$L is the change in L when the switch diodes 56 are switched;
C is the capacitance per unit length of the line; and
$\Delta$C is the change in C when the switch diodes 66 are switched.

For the conditions that:

$$\frac{\Delta L}{L}<<1 \text{ and } \frac{\Delta C}{C}<<1$$

the following approximation holds:

$$\beta\simeq\omega\sqrt{LC}+\frac{\Delta\omega L}{2\sqrt{L/C}}+\frac{\Delta\omega C}{2\sqrt{C/L}}$$

The incremental phase shift per unit length of the line due to $\Delta$L (when the switch diode 56 is changed) is then:

$$(\Delta\beta)_{\Delta L}=\frac{\Delta(\omega L)}{2\sqrt{L/C}}$$

and the incremental phase shift per unit length of the line due to $\Delta$C (when the switch diode 66 is changed) is:

$$(\Delta\beta)_{\Delta C}=\frac{\Delta\omega C}{2\sqrt{C/L}}$$

For a constant-impedance (non-reflecting) phase shifter, $$Z_0=\sqrt{\frac{L+\Delta L}{C+\Delta C}}$$

is maintained constant if $$\Delta L/L=\Delta C/C$$

Figure 6:
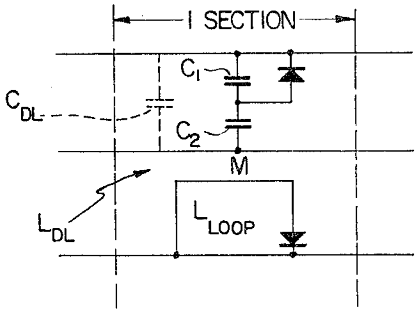
FIG. 6 is an illustrative schematic example of the operation of the invention.

FIG. 6 illustrates in schematic form a coaxial line phase-shift section according to FIG. 3. For the purposes of illustration, the following parameters are assumed:

(A) For the energy being propagated:
Mid-band operating frequency=1000 mc./sec.;
$Z_0$ of the line=100 ohms;
Power in the line=10 kw.;
$I_{line}$=10 amps (R.M.S.);
$V_{line}$=1000 volts (R.M.S.).

(B) For the line:
$C_1$=4.3 $\mu\mu$f.;
$C_2$=0.8 $\mu\mu$f.;
$C_{dl}$ (distributed capitance per unit length)=0.2 $\mu\mu$f.;
$L_{loop}$ (the loop inductance when the loop diode is conductive)=$0.5\times10^{-8}$ henry;
$L_{dl}$ (distributed inductance per unit length of center conductor=$10^{-8}$ henry;
$M=0.25\times10^{-8}$ henry (when loop diode is conductive).

(C) For the diode:
$C_{oc}$ (open-circuit (non-conductive state) diode capacitance)=negligible;
$I_d$ (closed)=5 amps. $V_d$ (open)=157 volts (R.M.S.) (both diodes).

for the foregoing parameters. When the diode across $C_1$ is closed, the capacitance of the line per unit length is $$C=C_2+C_{dl}=0.2+0.8\times10^{-12}f$$

When the diode in the loop is open, the line inductance per unit length is $$L=L_{dl}=10^{-8} \text{ henry}$$

Upon reversing the respective diode states:

$$\Delta C=0.125, \text{ or } \frac{10^{-12}}{8}f$$

$$\Delta L=M\times L_{loop}=0.25\times0.5=0.125$$
$$=\frac{10^{-8}}{8} \text{ henry}$$

From above:

$$\Delta\beta_{(\Delta L)}=\frac{\omega\Delta L}{2\sqrt{L/C}}$$

$$\Delta\beta_{(\Delta C)}=\frac{\omega\Delta C}{2\sqrt{C/L}}$$

The expression $$\sqrt{L/C}=\sqrt{\frac{10^{-8}}{10^{-12}}}=\sqrt{10^4}=100$$

The expression $$\sqrt{C/L}=\sqrt{\frac{10^{-12}}{10^{-8}}}=\sqrt{10^4}=\frac{1}{100}$$

$$\omega=2\pi\times10^9 \text{ radians}$$

$$\Delta\beta_{(\Delta L)}=\frac{2\pi\times10^9\times10^{-8}}{8\times2\times10^2}=\frac{\pi\times10^9\times10^{-10}}{8}$$

$$\Delta\beta_{(\Delta C)}=\frac{2\pi\times10^9\times10^{-12}}{8\times2\times10^{-2}}=\frac{\pi\times10^9\times10^{-10}}{8}$$

Hence, for the parameters assumed above, $$\Delta\beta_{(\Delta L)}=\Delta\beta_{(\Delta C)}=0.0395 \text{ radian (approx.)}$$
$$\Delta\beta_{(\Delta L)}+\Delta\beta_{(\Delta C)}=0.078 \text{ radian}=4.5 \text{ degrees (approx.)}$$

Figure 7:
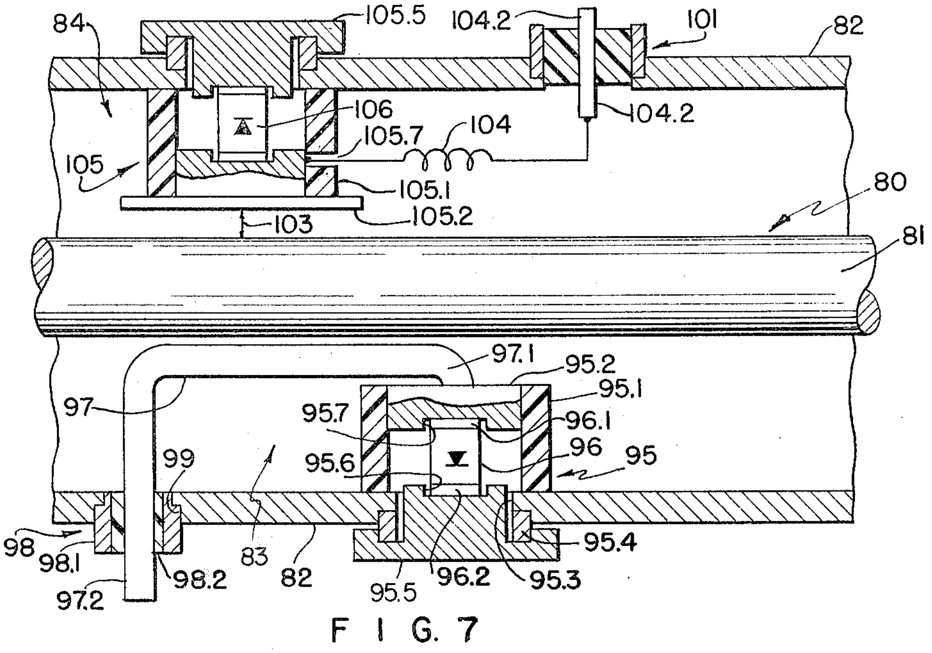
FIG. 7 illustrates the invention as applied to a coaxial transmission line.

In FIG. 7, a section of coaxial line 80, having the usual inner conductor 81 and outer conductor 82, is shown fitted with an inductive phase shift section 83 according to the principles of FIG. 1, and a capacitive phase-shift section 84 according to the principles of FIG. 2. The inductive section comprises a diode 96 in a socket generally shown at 95. The socket comprises an electrically insulating tubular member 95.1 affixed at one end, as by suitable cement (not shown), to the inner surface of the outer conductor 82, and having an electrically-conductive plug 95.2 in the other end. A hole 95.3 through the outer conductor is in register with the tubular member 95.1, and an electrically-conductive collar 95.4 is fitted in the periphery of this hole to extend from the exterior of the outer conductor in axial register with the insulating member 95.1. A cap 95.5 of electrically-conductive material fits over the collar and has a central portion extending through this hole 95.3 to hold the diode 96 between the plug 95.2 and the cap 95.5. To this end, the confronting surfaces of the plug and the cap have depressions 95.6 and 95.7, respectively, for receiving and holding the electrodes of the diode 96. The diode itself is of a type which has electrodes in the form of plates or discs 96.1 and 96.2 at two opposite ends, with no wire leads extending away from the electrodes. A loop conductor 97 is connected at one end 97.1 to the plug 95.2 and passes at the other end 97.2 through the outer conductor 82 via a by-pass capacitor generally shown at 98. The outer conductor has a hole 99 fitted with a short tubular extension 98.1 of electrically-conductive material extending outward from the outer conductor. An electrically-insulating sleeve 98.2 lines the extension, and the loop conductor 97 passes through this sleeve. The sleeve 98.2 is the dielectric between capacitor plates constituted by the portion of the loop conductor 97 therein and the tubular extension 98.1. It will be seen that the capacitor 98 of FIG. 7 is a structural equivalent of the by-pass capacitor 21 shown in FIG. 1, and that a control voltage may be applied between the loop conductor end portion 97.2 and the outer conductor 82 of the transmission line in the same manner as between the corresponding elements 19.2 and 12, respectively, in FIG. 1.

The capacitive phase-shift section 84 comprises a diode 106 in a socket generally shown at 105, and similar in structure to the socket 95 of the inductive phase-shift section 83. The diode 106 is similar in external physical configuration to the diode 96 shown in the inductive phase-shift section, and is held in the socket 105 between a plug 105.2 and a cap 105.5. The wall of the insulating tubular member 105.1 has an aperture 105.7 through which one end of an inductor 104 is connected to the plug 105.2. The other end of the inductor is connected to a wire 104.2 which passes through the outer wall 82 of the transmission line via a by-pass capacitor generally shown at 101. The latter capacitor is similar in construction to the by-pass capacitor 98 of the inductive phase-shift section 83. It will be appreciated that a control voltage may be applied between the outer end of the conductor 104.2 and the outer conductor 82, in the same manner as between the corresponding elements 42.2 and 32 in FIG. 2; and that the capacitors $C_1$ and $C_2$ in FIG. 2 find their respective equivalents in FIG. 7, in the gap 103 between the plug 105.2 and the inner conductor 81, and in the inherent capacitance $C_d$ of the diode 106. The equivalent circuit of the capacitors in FIG. 7 is more nearly as is represented by the capacitors $C_A$ and $C_B$ in FIG. 4. The common junction 39 of the capacitors in FIG. 2 corresponds to the point at which one end of the inductor 104 is connected to the plug 105.2 in FIG. 7.

Clearly, the line 80 may be fitted with iterative sets of inductive and capacitive phase-shift sections 83 and 84, respectively, and these may be operated in a manner to provide a constant-impedance phase shifter, as is discussed above with reference to FIGS. 3 and 4.

Figure 8:
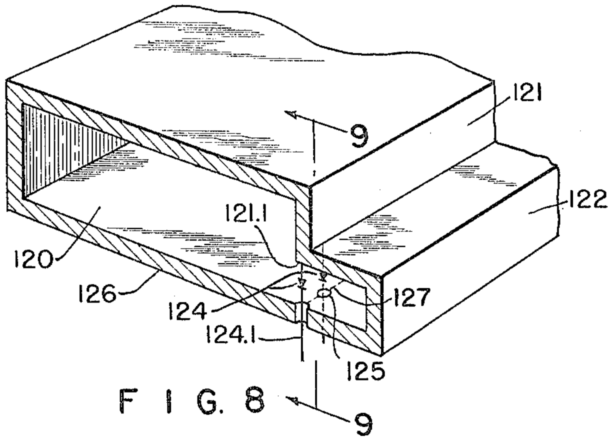
Figure 9:
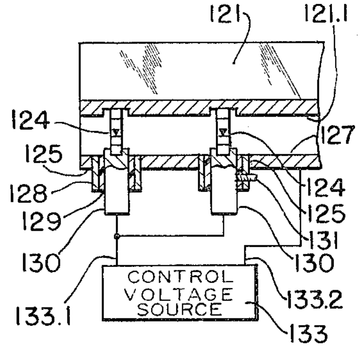

In FIGS. 8 and 9, a rectangular waveguide 120 is fitted at one of its narrow sides 121 with an elongated inductive cavity 122 which is open throughout its entire length to the interior of the waveguide. An array of diodes 124 are connected between an inner edge 121.1 of the narrow side 121 and the exterior of the waveguide, as is shown schematically in FIG. 8, and structurally in detail in FIG. 9. FIG. 8 shows the diodes schematically for the sake of simplicity; here the diodes are shown each as having an electrode connected to a conductor 124.1 passing through a hole 125 in the lower wide wall 126 of the waveguide along the line 127 (shown dashed) of junction with the cavity 122. As is shown in FIG. 9, each hole 125 is fitted with a tubular extension 128 lined with an insulating sleeve 129 through which a plug 130 fits telescopically, to hold the diodes 124 in place between the plugs and the confronting edge 121.1 of the narrow side 121. Each plug may be held in position by a setscrew 131, only one of which is illustrated. The diodes 124 are similar in external physical construction to the diodes 96 and 106 shown in FIG. 7, and the plugs 130 correspond to the wires 124.1 shown in FIG. 8. Each plug 130 is connected to one terminal 133.1 of a control voltage source 133, of which the other terminal 133.2 is connected to an outer wall of the waveguide 120.

When the diodes 124 are in the open-circuit condition, each acts as a capacitor in parallel with the inductance of the cavity 122, thereby placing a tank circuit in series with the current flowing in the narrow side wall 120 during propagation of electromagnetic wave energy in the fundamental mode in the waveguide. When the diodes are in the closed-circuit condition, this tank circuit is effectively shunted by a short-circuit. Thus, when the diodes 124 are nearly-open circuits, the waveguide 120 is effectively widened compared to the case when they are nearly-short-circuits. This will change the cut-off frequency of a high-power wave, yet will not employ the diodes beyond their maximum current and voltage ratings, which may be much smaller. The tubular extensions 128, lining sleeves 129 and plugs 130 act as R.F. by-pass capacitors. R.F. chokes (not shown) may be employed in the D.C. bias control circuits.

Figure 10:
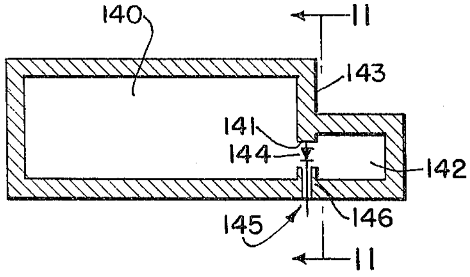
Figure 11:
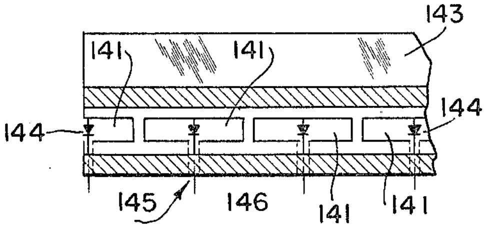
Figure 12:
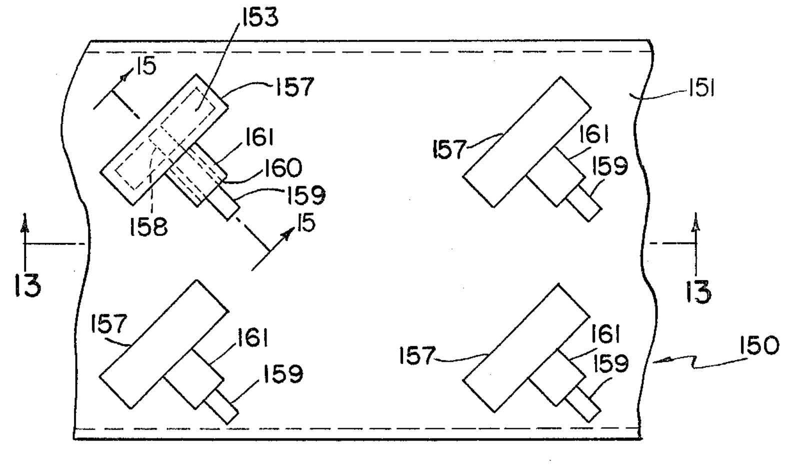

FIGS. 10 and 11 illustrate a modified embodiment of the invention according to FIGS. 8 and 9, in which an inductive trough 142 is coupled to a rectangular waveguide 140 through an array of coupling slots 141 in a narrow side wall 143. Diodes 144 are coupled one across the approximate midregion of each slot, each diode being directly connected at one side to a long edge of the slot and coupled at the other side to the opposite long edge via a R.F. by-pass capacitor 145 and a hole 146 through which D.C. bias potential may be applied, as in FIG. 9 for example.

When the diodes 144 are nearly-open-circuited, each slot 141 is effective to couple a small quantity of energy into the cavity or trough 142, but when the diodes are nearly-short-circuited they effectively shunt the slots. The slots 141 each control the amount of energy coupled into the cavity 142, as well as the maximum voltage ($Vm$) and the maximum current ($Im$) applied to the diode coupled across it.

Figure 13:
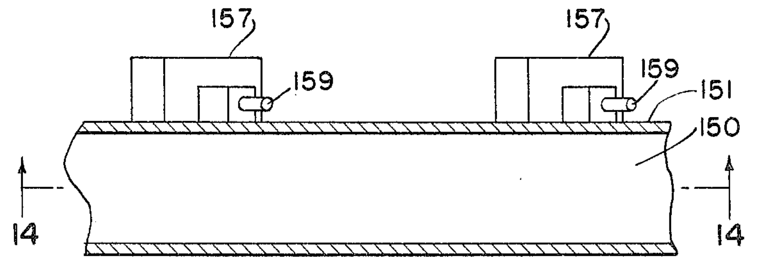
Figures 14, 15:
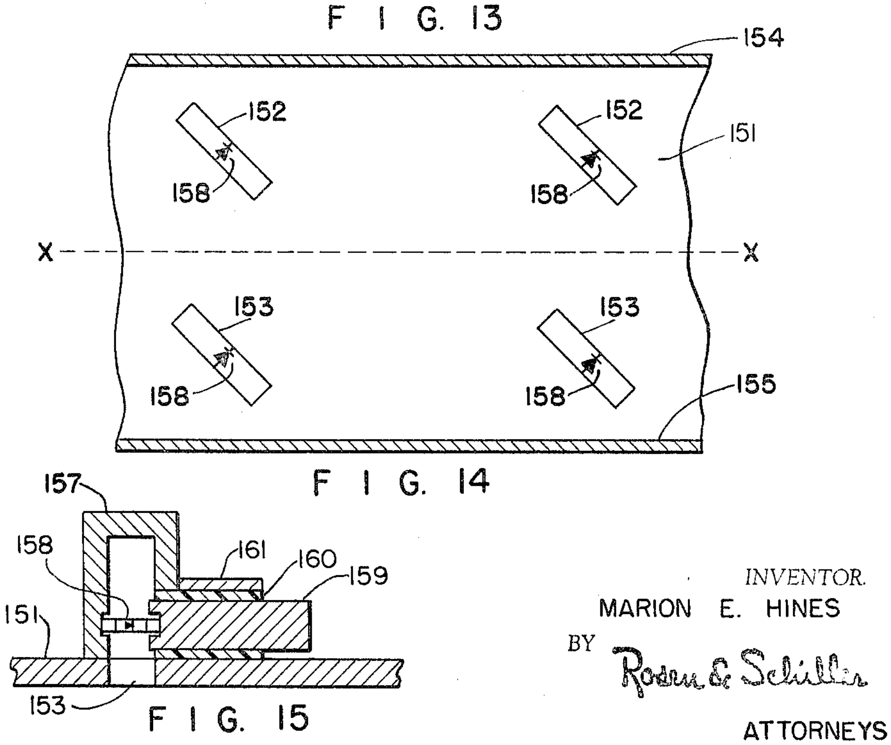

In the embodiment of the invention illustrated in FIGS. 12–15, FIG. 12 is a top plan view; FIG. 13 is a section taken along line 13—13 of FIG. 12; FIG. 14 is a section taken along line 14—14 of FIG. 13; and FIG. 15 is a partial section taken along line 15—15 of FIG. 12. As seen in FIG. 14, an axially-spaced array of pairs of slots 152, 153 is disposed in the wide wall 151 of a rectangular waveguide 150. Each slot is centered substantially mid-way between the axial center-line X—X (shown dashed in FIG. 14) and one of the side-walls 154 or 155, and is oriented so that its longer dimension makes an angle of approximately 45° with the guide axis. A cavity, in the form of a rectangular trough member 157 with closed ends is abutted to each slot outside the waveguide and is coupled to the interior of the waveguide via the slot. The cavities are smaller than would be required for resonance, and serve to allow current to split at the slots without radiating energy out of the waveguide 150. A diode 158 is coupled across each slot, as is shown in detail in FIG. 15, and represented only schematically in FIG. 14. Referring to FIG. 15, the diode 158 is held in position across the slot 153 by means of a plug 159 slidably fitted into an insulating sleeve 160, which in turn is held against the wall 151 and covered by an electrically conductive member 161 which abuts the outer side wall of the cavity 157. As in FIG. 9, the plugs 159 can all be connected to a control-voltage source (not shown), to switch the diodes from a conducting to a non-conducting state, or vice versa. The insulating sleeve 160 is the dielectric of an R.F. bypass capacitor. R.F. choke means may be employed in the D.C. bias circuits.

The slots 152, 153 present a variable or a switchable reactance to the flow of R.F. wall current perpendicular to the longer dimensions of the slots, but do not appreciably perturb the flow of R.F. wall current parallel to the long slot-dimensions. It is characteristic of such a slot-pair 152, 153 that it causes scattering of the wave, which is unsymmetrical in the two axial directions. In waveguide, we may place the slots in a region where the magnetic field (and wall current) is approximately circularly polarized. When this position (off to each side of the axis X—X as shown in FIG. 14) is properly chosen for a given R.F. frequency, any pair of slots 152, 153 located one on each side of this axis will cause no reflection of the incident wave but will scatter only in the forward direction, causing a net phase shift in transmission. An advantage of the arrangement is that a pair of slots 152, 153 and their diodes can be, in effect, "matched" such that the VSWR can be made unity at a given frequency, independent of the switched state of the diode.

The embodiments of the invention which have been illustrated and described herein are but a few illustrations of the invention. Other embodiments and modifications will occur to those skilled in the art. No attempt has been made to illustrate all possible embodiments of the invention, but rather only to illustrate its principles and the best manner presently known to practice it. Therefore, while certain specific embodiments have been described as illustrative of the invention, such other forms as would occur to one skilled in this art on a reading of the foreing specification are also within the spirit and scope of the invention, and it is intended that this invention includes all modifications and equivalents which fall within the scope of the appended claims.

What is claimed is:

1. Circuit for introducing a phase shift into an electromagnetic wave propagating in a transmission line comprising: a section of transmission line, a semiconductor device capable of being voltage-biased to establish at least one of its electrical characteristics, means reactively coupling said device to said line, said coupling means being arranged to couple said device so lightly to said wave that electromagnetic voltage and current, each of a magnitude which is small with respect to the respective magnitudes of the voltage and current components of said wave, are imposed across said device, and means independently to apply a unidirectional voltage across said device to control an electrical characteristic thereof and thereby control the effect of said coupling means.

2. Circuit according to claim 1 comprising an array of semiconductor devices and coupling means spaced less than one-half wave length apart along said line relative to said wave, and means to apply a unidirectional voltage across each device, whereby the phase shifts due to each member of the array are cumulative.

3. Circuit according to claim 1 comprising a series circuit of an elongated conductor and said semiconductor device which series circuit has first and second spaced-apart points coupled to respective first and second spaced-apart points on a first side of said line, and a region of said conductor intermediate said first-named points inductively coupled to the second side of said line.

4. Circuit according to claim 3 in which at least said first points are capacitively coupled with no direct contact at said first points between said conductor and said first side of said line, said unidirectional voltage means is connected at a first side to said first side of said line and at a second side to said conductor at said first point thereof, and said semiconductor device is connected in series with said conductor between said second side of said unidirectional voltage means and said second points.

5. Circuit according to claim 1 comprising a first capacitor connected at one side to a first side of said line and at the other side to one terminal of said device, a second terminal of said device being coupled to a second side of said line.

6. Circuit according to claim 5 in which a second capacitor is connected at one side to said one terminal of said device and at the other side to said second side of said line.

7. Circuit according to claim 5 in which said unidirectional voltage means is connected at a first side to said second side of said line and at a second side to said other side of said first capacitor.

8. Circuit according to claim 6 in which said second terminal of said device is capacitively coupled without direct contact to said second side of said line, and said unidirectional voltage means is connected at a first side directly to said second side of said line and at a second side directly to said second terminal of said device.

9. Circuit according to claim 1 in which said transmission line is a wave guide, said coupling means is slot means in a wall thereof, and said device is coupled across said slot.

10. Circuit according to claim 9 in which said waveguide is rectangular, said slot means comprising an array of slots in a broad wall thereof, each slot having its long dimension disposed substantially 45° relative to the guide axis and being centered substantially mid-way between said axis and a side wall, a separate device is coupled across each slot, and including means to apply a unidirectional voltage across each of said devices.

11. Circuit for introducing a phase shift into an electromagnetic wave propagating in a transmission line comprising: a section of transmission line, a first semiconductor device capable of being voltage biased to establish at least one of its electrical characteristics, first means inductively coupling said first device to said line, said first coupling means being arranged to couple said first device so lightly to said wave that electromagnetic voltage and current, each of a magnitude which is small with respect to the respective magnitudes of the electromagnetic voltage and current components of said wave, are imposed across said first device, a second semiconductor device capable of being voltage biased to establish at least one of its electrical characteristics, second means capacitively coupling said second device to said line, said second coupling means being arranged to couple said second device so lightly to said wave that electromagnetic voltage and current, each of a magnitude which is small with respect to said respective magnitudes, are imposed across said second device, and means independently to apply a unidirectional voltage across each of said devices to control an electrical characteristic thereof and thereby control the effect of each of said coupling means.

12. Circuit according to claim 11 in which each of said semiconductor devices is a diode which is voltage-switchable between first and second states in one of which it is substantially more conductive than in the other, and said unidirectional voltage means is adapted to apply to each of said diodes voltage at one or the other of two levels each of which levels establishes in the diode to which applied a unique one of said states, said voltage means being arranged simultaneously to place one of said diodes in its more conductive state and the other of said diodes in its less conductive state.

13. Circuit according to claim 12 in which said unidirectional voltage means has a single output which is applied simultaneously to both of said diodes, and said diodes are each poled relative to said voltage means so that when said output places one of said diodes in one of its said states it places the other of said diodes in the other of its said states.

14. A circuit for shifting the phase of an electromagnetic wave propagating in a transmission line comprising: a section of transmission line having inherent effective inductance and effective capacitance, inductive means associated with said section, capacitive means associated with said section, and semiconductor means connected to said inductive means and said capacitive means for simultaneously and controllably both changing the degree to which said inductive means and said capacitive means add to the inherent inductance and effective capacitance of said line and maintaining the inductance to capacitance ratio of said line substantially constant whereby operation of said semiconductor means shifts the phase of a wave propagating in said line.

15. A circuit according to claim 14 in which said circuit is an iterative circuit and said semiconductor means are diode switches whereby the amount of phase shift is selected by the number of iterative components switched by said diode switches.

References Cited by the Examiner

UNITED STATES PATENTS

| | | | |
|---|---|---|---|
| 2,462,893 | 3/1949 | Pontecorvo | 329—161 X |
| 2,959,778 | 11/1960 | Bradley | 333—7 X |
| 3,109,152 | 10/1963 | Dachert | 333—31 |
| 3,177,433 | 4/1965 | Simon et al. | 307—88.5 |
| 3,202,983 | 8/1965 | James. | |

ELI LIEBERMAN, *Primary Examiner.*

P. L. GENSLER, *Assistant Examiner.*